(12) United States Patent
Yoon et al.

(10) Patent No.: US 6,512,196 B1
(45) Date of Patent: Jan. 28, 2003

(54) LASER CUTTING DEVICE AND METHOD FOR CUTTING GLASS SUBSTRATE BY USING THE SAME

(75) Inventors: Tae Hwan Yoon, Seoul (KR); Jeong Hyun Kim, Kyonggi-do (KR); Youn Gyoung Chang, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 68 days.

(21) Appl. No.: 09/665,118

(22) Filed: Sep. 20, 2000

(30) Foreign Application Priority Data

Sep. 21, 1999 (KR) .............................. 99-40645

(51) Int. Cl.[7] ........................ B23K 26/14; B23K 26/16; B23K 26/02
(52) U.S. Cl. .............................. 219/121.67; 219/121.82
(58) Field of Search .................... 219/121.67, 121.6, 219/121.72, 121.78, 121.85, 121.82; 349/187

(56) References Cited

U.S. PATENT DOCUMENTS

| | | | | |
|---|---|---|---|---|
| 4,248,369 A | * | 2/1981 | Clausen .................. | 219/121.85 |
| 4,467,168 A | * | 8/1984 | Morgan et al. ......... | 219/121.67 |
| 4,682,003 A | * | 7/1987 | Minakawa et al. .... | 219/121.67 |
| 5,138,131 A | * | 8/1992 | Nishikawa et al. .... | 219/121.67 |
| 5,968,382 A | * | 10/1999 | Matsumoto et al. ... | 219/121.67 |
| 6,204,472 B1 | * | 3/2001 | Muzzi et al. .......... | 219/121.67 |
| 6,297,869 B1 | * | 10/2001 | Choo et al. .................. | 349/187 |

* cited by examiner

*Primary Examiner*—Tom Dunn
*Assistant Examiner*—Zidia Pittman
(74) *Attorney, Agent, or Firm*—Mckenna Long & Aldridge LLP

(57) ABSTRACT

Laser cutting device for cutting a glass substrate of a liquid crystal display, and methods for cutting a glass substrate using that device. The device includes a vacuum chuck rotatably mounted for securing bonded first and second substrates, a rotating member for rotating the vacuum chuck, and a laser for directing a laser beam onto the first and second substrates into cut the substrates held by the vacuum chuck.

23 Claims, 7 Drawing Sheets

(S1)

(S2)

(S3)

(S10)

(S20)

(S100)

(S200)

LASER CUTTING DEVICE AND METHOD FOR CUTTING GLASS SUBSTRATE BY USING THE SAME

This application claims the benefit of Korean Patent Application No. 1999-40645, filed on Sep. 21, 1999, the entirety of which is hereby incorporated by reference as if fully set forth herein.

BACKGROUND OF THE INVENTION

1. Field of the Invention

The present invention relates to a laser cutting device for cutting a glass substrate of a liquid crystal display, and to a method of cutting such a glass substrate.

2. Discussion of the Related Art

In general, as a major component of a liquid crystal display (LCD), various glass substrates have been developed to meet different requirements, such as display type, driving systems, fabrication processes, and such. In a liquid crystal display fabrication process, the alignment and bonding of upper and lower substrates, the injecting a liquid crystal between the bonded upper and lower glass substrates, and the cutting the upper and lower glass substrates to a required size are important processes and are very closely related to device yield. A related art method for cutting the glass substrate will be explained. FIGS. 1A and 1B illustrate sections of upper and lower glass substrates that will help explain the steps of a related art method of cutting an LCD glass substrate using a diamond cutting device.

Referring to FIG. 1A, after bonding a lower substrate 10a and an upper glass substrate 10b of an LCD, the upper glass substrate 10b is cut along a cutting line A1 using a diamond cutting device, and the lower glass substrate 10a is cut along a cutting line A2. As a result, as shown in FIG. 1B, grinding of the cut surfaces is required as the cut surfaces are not smooth, as can be seen when the cutting surfaces are viewed under a magnifier. Glass particles formed in the cutting can attach to surfaces of the substrate, causing defects, Thus, a separate process for removing the glass particles is required. Damage to substrates caused by defective cuts result in poor yield, as well as a complicated fabrication process that mitigates the damage. Furthermore, it is possible that damaging static electricity can result during the grinding.

Recently, a method of cutting glass substrates using a laser beam has been suggested as an alternative to cutting with the diamond cutting device. FIGS. 2A and 2B illustrate sections of upper and lower glass substrates that will help explain the steps of cutting an LCD glass substrate by using a laser beam.

Referring to FIG. 2A, after an upper glass substrate 10b and a lower glass substrate 10a are bonded, the upper glass substrate 10b is cut along a cutting line A1 by directing a laser beam thereto from an upper side of the upper glass substrate 10b. Additionally, the lower glass substrate 10a is cut along a cutting line A2 by directing a laser beam along a cutting line A2 from a lower side of the lower glass substrate 10a. As a result, as shown in FIG. 2B, the upper and lower glass substrates 10a and 10b are cut. In this instance, though the cutting surfaces are smooth, the edges of the cutting surfaces are sharp, having almost 90° angles. When using a TAB(Tape Automatic Bonding), or a TCP (Tape Carrier Package), grinding of the sharp edges is required as the tape is liable to be cut by the edges.

That is, a laser beam is directed to the upper substrate from above to cut the upper substrate, and a laser beam is directed to the lower substrate from underneath to cut the lower substrate. According to this, though the cut edge on the side the laser beam is directed to is rounded, the opposite edge is still approximately 90°. Accordingly, as the edge through which TAB or TCP proceeds is the edge of the lower glass substrate nearest the upper glass substrate, that edge being approximately 90°, there is still a high possibility of damage to the TAB or TCP.

SUMMARY OF THE INVENTION

Accordingly, the present invention is directed to a laser cutting device for cutting a glass substrate of a liquid crystal display, and a method for cutting a glass substrate by using the same, that substantially obviates one or more of the problems due to limitations and disadvantages of the related art.

An object of the present invention is to provide a laser cutting device for cutting a glass substrate of a liquid crystal display and that can provide a sloped cut surface suitable for use with TAB, TCP or FPC.

Another object of the present invention is to provide a method for cutting a glass substrate by using the laser cutting device that is applicable to TAB, TCP or FPC bonding of the glass substrate.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the laser cutting device includes a vacuum chuck rotatably mounted for securing first and second substrates which are bonded, a rotating member for rotating the vacuum chuck, and a laser oscillator for directing a laser beam to the first and second substrates in one direction for cutting the substrates held by the vacuum chuck.

In other aspect of the present invention there is provided a method for cutting a glass substrate by using a laser cutting device, including the steps of (a) securing first and second substrates, both of which are bonded, to a vacuum chuck, (b) rotating the vacuum chuck so that the bonded first and second substrates face the ground, and (c) directing a laser beam to the first and second substrates from below, to cut the substrates.

In another aspect of the present invention, there is provided a method for cutting a glass substrate by using a laser cutting device, including the steps of (a) securing first and second substrates, both of which are bonded, to a vacuum chuck, (b) directing a laser beam to the second substrate from above, to cut the second substrate, (c) rotating the vacuum chuck so that the bonded first and second substrates face the ground, and (d) directing a laser beam to the first substrate from below, to cut the first substrate.

In further aspect of the present invention, there is provided a method for cutting a glass substrate by using a laser cutting device, including the steps of (a) securing first and second substrates, both of which are bonded, to a vacuum chuck, (b) rotating the vacuum chuck with respect to the ground by an angle, and directing a laser beam toward one end portion of each of the first and second substrates to cut the one end portion of each of the first and second substrates, and (c) rotating the vacuum chuck in an opposite direction with respect to the ground, and directing the laser beam to the other end portions of the first and second substrates, to cut the other end portions of the first and second substrates.

Preferably, the bonded first and second substrate are rotated to face the ground with an angle, and the laser beam is directed thereto from below, when the laser is directed in a vertical direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1A:
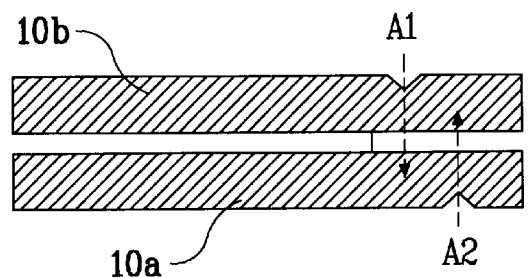
FIGS. 1A and 1B illustrate sections of glass substrates for showing the steps of a related art method for cutting an LCD glass substrate using a diamond cutting device.
Figure 1B:
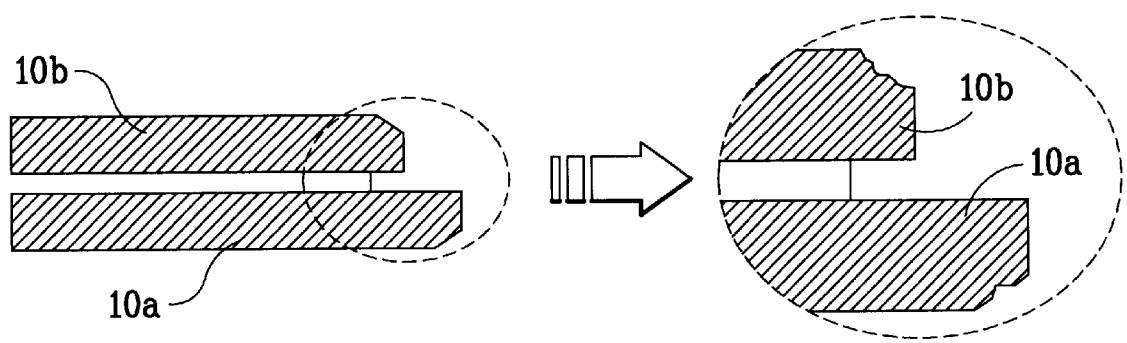
Figure 2A:
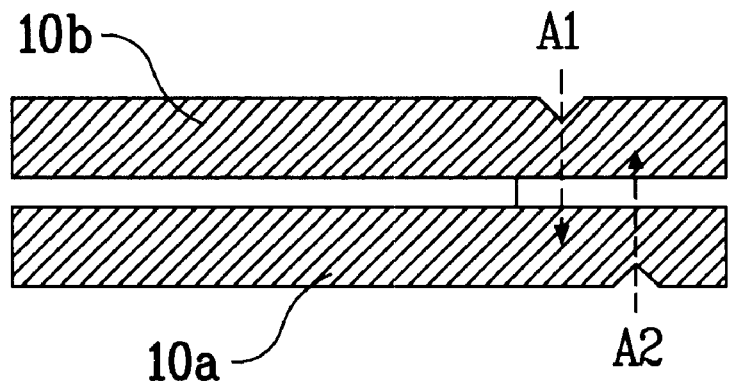
FIGS. 2A and 2B illustrate sections of glass substrates showing the steps of a related art method for cutting an LCD glass substrate using a laser beam.
Figure 2B:
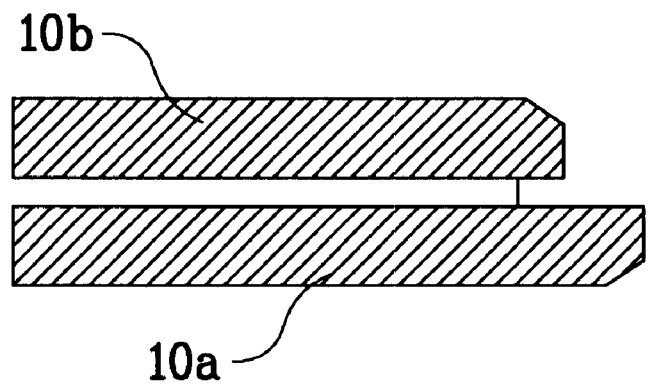
Figure 3:
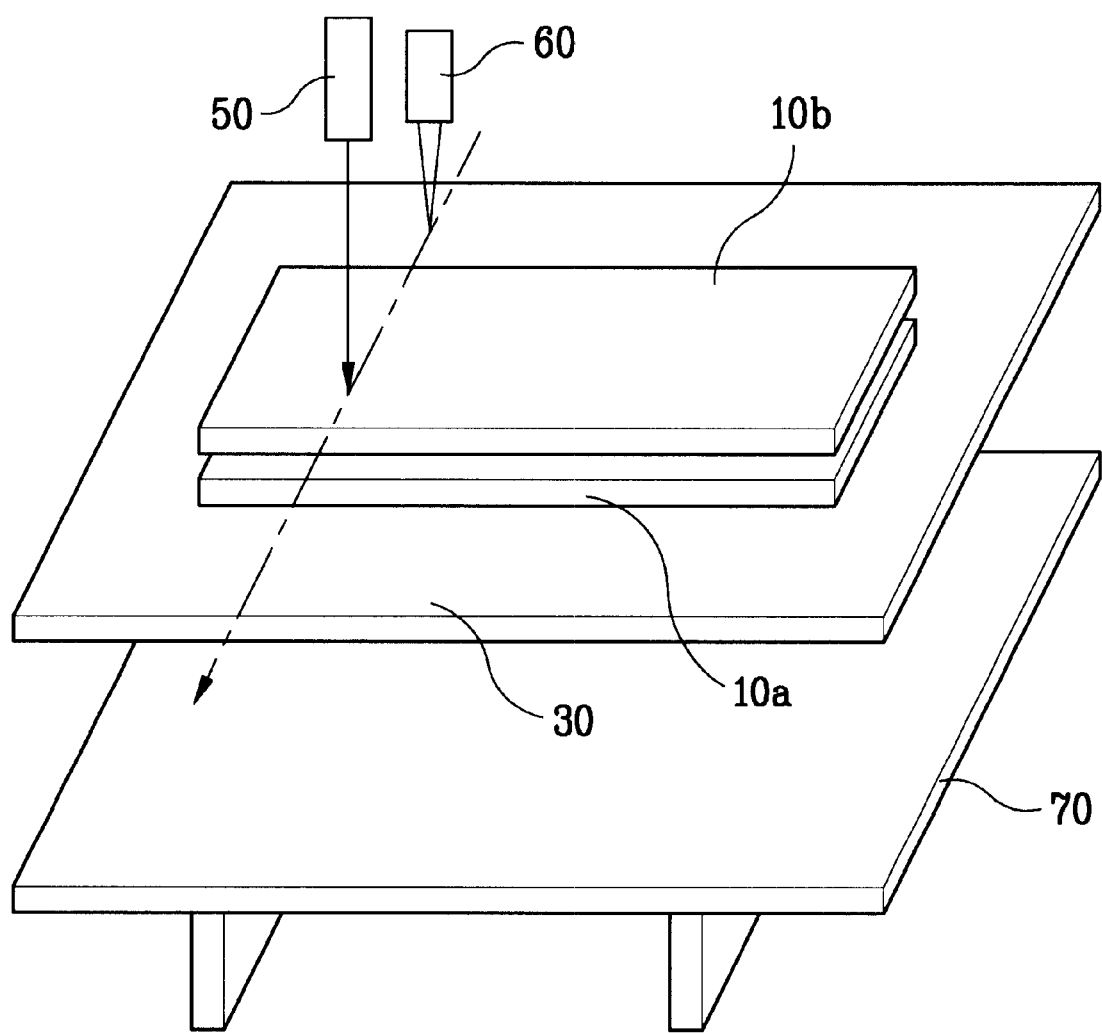
FIG. 3 schematically illustrates a laser cutting device in accordance with a preferred embodiment of the present invention.

Reference will now be made in detail to preferred embodiments of the present invention, examples of which are illustrated in the accompanying drawings. FIG. 3 schematically illustrates a perspective view of a laser cutting device in accordance with a preferred embodiment of the present invention.

Referring to FIG. 3, the laser cutting device in accordance with a preferred embodiment of the present invention includes a vacuum chuck 30 for securing bonded upper and lower glass substrates 10a and 10b to the vacuum chuck even as vacuum chuck is rotated. The laser cutting device further includes a laser oscillator 50 for directing a laser beam for cutting the upper and lower glass substrates 10a and 10b secured to the vacuum chuck 30 in one direction. Additionally, a transporter 70 under the vacuum chuck 30 collects substrate pieces cut by the laser beam. Though not shown, the laser cutting device includes a rotating member for rotating the vacuum chuck 30 through an angle of at least 180°. The rotating member has a system that rotates the vacuum chuck 30 and the laser oscillator 50 as a unit such that the bonded substrates on the vacuum chuck 30 can be located under the vacuum chuck 30 by rotating the vacuum chuck 30. This makes for easy disposal of cut substrate pieces. Moreover, a cleaning device 60, such as an air blow or water jet, may be provided for removal of particles from the vicinity of the cutting surface (see below). In FIG. 3, the arrow following the one dot chain line indicates a scanning direction of the laser oscillator, while the arrow at the end of the solid line indicates a direction of the laser beam.

Figure 4:
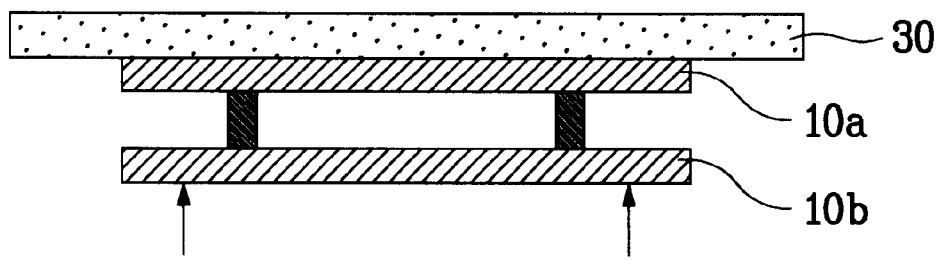
FIG. 4 schematically illustrates a method for cutting a substrate by using the laser cutting device illustrated in FIG. 3.
Figure 4:
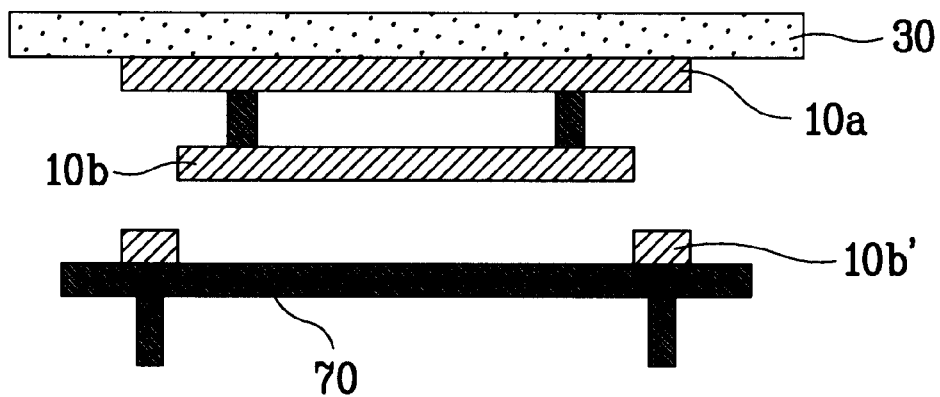
Figure 4:
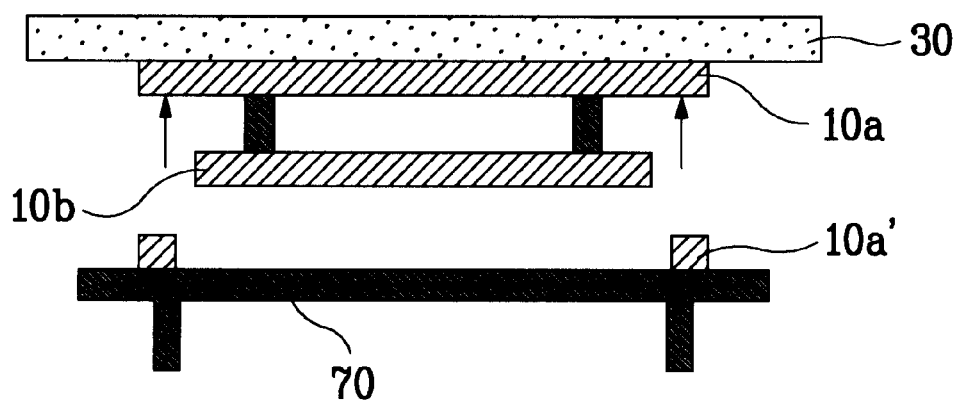

FIG. 4 illustrates a method for cutting a substrate by using the laser cutting device in accordance with FIG. 3.

First, bonded upper and lower substrates 10b and 10a are secured to the vacuum chuck 30. Then, the vacuum chuck 30 is rotated by 180° by using the rotating member (not shown) so that the bonded upper and lower substrate 10b and 10a are under the vacuum chuck 30. Then, a laser beam, represented by the arrows in FIG. 4 (S1), is directed from below onto the bonded upper and lower substrate 10b and 10a to cut the upper glass substrate 10b. The cut substrate pieces 10b' then fall down onto the transporter 70, see FIG. 4 (S2). The transporter then removes the cut pieces 10b' from the vicinity of the vacuum chuck. In succession, the laser beam is directed from underneath onto the lower substrate 10a, as shown by arrows in FIG. 4 (S3). Then, the cut glass pieces 10a' fall onto the transporter 70 and are transported away.

Figure 5:
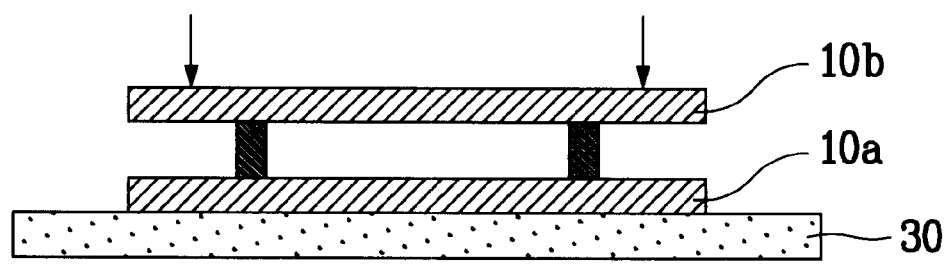
FIG. 5 schematically illustrates another method for cutting a substrate using the laser cutting device illustrated in FIG. 3.
Figure 5:
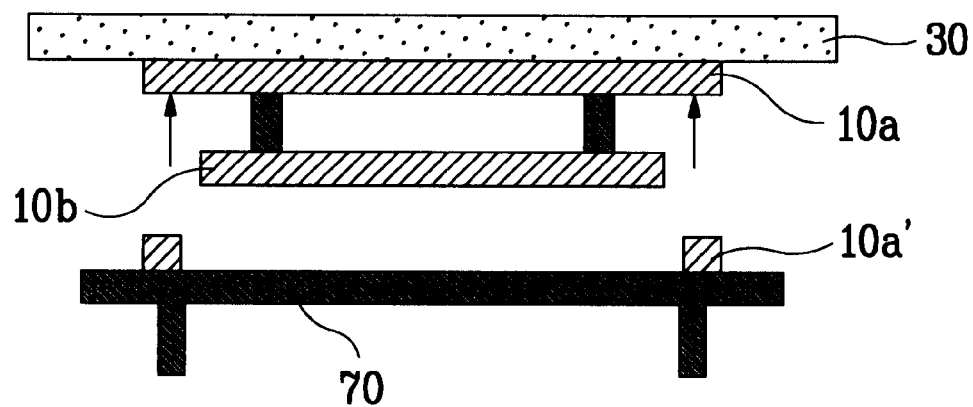

FIG. 5 schematically illustrates another method of cutting a substrate using the laser cutting device illustrated in FIG. 3.

First, bonded upper and lower substrates 10b and 10a are secured to the vacuum chuck 30. Then, a laser beam is directed onto the upper substrate 10b from above to cut the upper substrate 10b, see FIG. 5 (S10). After the cutting of the upper substrate 10b, the vacuum chuck 30 is rotated 180° using the rotating member (not shown) so as to drop the cut substrate pieces onto the transporter 70, which transports them away from the laser beam. In succession, the laser beam is directed onto the lower glass substrate 10a from underneath. The cut substrate pieces 10a' drop onto the transporter 70, which transports it away from the laser beam.

Figure 6:
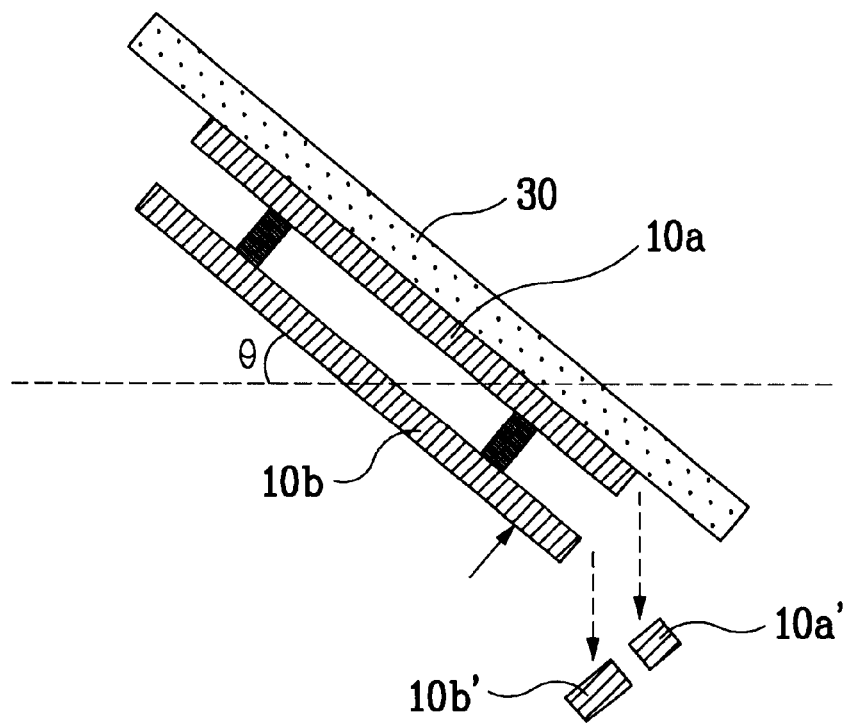
FIG. 6 schematically illustrates another method for cutting a substrate using the laser cutting device illustrated in FIG. 3.
Figure 6:
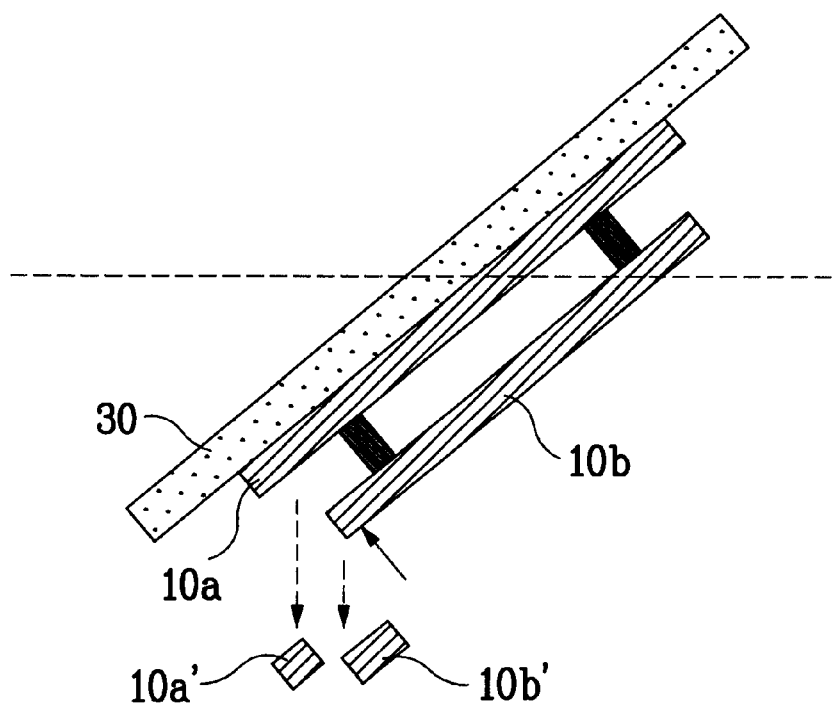

FIG. 6 schematically illustrates another method for cutting a substrate using the laser cutting device illustrated in FIG. 3.

First, bonded upper and lower substrates 10a and 10b are secured to the vacuum chuck 30. The vacuum chuck 30 is then rotated by an angle ($0° \leq \theta \leq 180°$) by using the rotating member. A laser beam is then directed to lower portions of the bonded upper and lower substrates 10a and 10b from underneath to cut off the upper glass substrate 10b. The cut substrate piece 10b' then drops down. The lower glass substrate 10a is then cut off and the cut substrate piece 10a' drops down, see FIG. 6 (S100). Then, the vacuum chuck 30 is rotated in the opposite direction and the glass substrates 10b is cut off by the same method. The cut substrate pieces 10b' then drop down. In succession, by using the same method, the glass substrate 10a is cut off and the cut substrate 10a' drops down. See FIG. 6 (S200).

In each of the cutting embodiments any fine substrate pieces formed in the vicinity of the cut during the laser cutting can be forcibly removed by using the cleaning device 60 shown in FIG. 3.

FIG. 7 schematically illustrates a glass substrate cut by the methods described above.

Figure 7A:
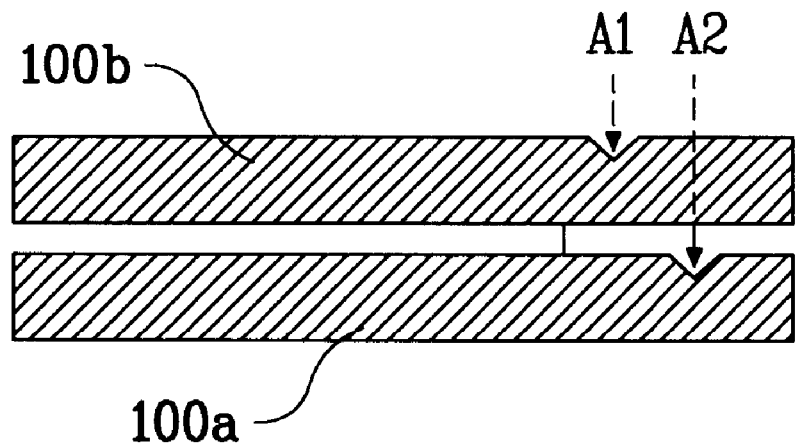
FIG. 7 schematically illustrates a glass substrate cut by a method of the present invention.
Figure 7B:
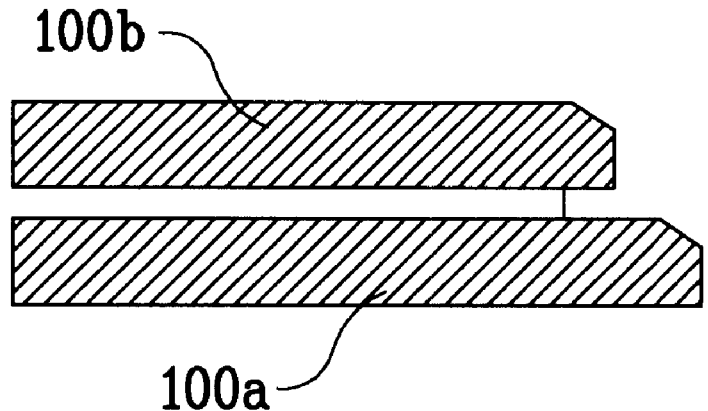

Referring to FIG. 7A, the bonded upper and lower substrates 100b and 100a are cut along cutting lines A1 and A2 by a laser beam directed thereto. As a result, the two substrates 100a and 100b have a form as shown in FIG. 7B, which have not only smooth cut surfaces, but also a rounded edge to prevent cut off of TAB, TCP, or FPC attachments.

As has been explained, the laser cutting device for cutting a glass substrate of a liquid crystal display, and the methods for cutting a glass substrate by using the same has the following advantages.

First, because the laser beam is directed in one direction for both of the upper and lower substrates, edges of cut surfaces are rounded, thereby permitting cutting off of the TAB, TCP, or FPC attachments.

Second, the laser rounding of cutting edges to smooth surfaces enables the omission of separate cutting and grinding operations, thus enabling a reduction in defects caused by ESD.

Third, the removal of cut substrate pieces by gravity and the cleaning of the fine substrate pieces by the cleaning device reduces the difficulty of cleaning, thereby reducing defective products as glass chips are removed.

It will be apparent to those skilled in the art that various modifications and variations can be made in the laser cutting device and in methods for cutting a glass substrate using that cutting device without departing from the spirit or scope of the invention. Thus, it is intended that the present invention cover the modifications and variations of this invention provided they come within the scope of the appended claims and their equivalents.

What is claimed is:

1. A laser cutting device comprising:
    a vacuum chuck for securing and fixing first and second substrates which are bonded;
    a rotating member for rotating the vacuum chuck such that the vacuum chuck can be turned upside down; and,
    a laser oscillator for directing a laser beam to the first and second substrates in one direction for cutting the substrates held by the vacuum chuck.

2. A laser cutting device as claimed in claim 1, further comprising a transporter for recovering a cut substrate piece by the laser beam.

3. A laser cutting device as claimed in claim 1, further comprising a cleaning device for removing substrate pieces formed in the vicinity of a cut surface during the laser cutting.

4. A method for cutting a glass substrate by using a laser cutting device, comprising the steps of:
    (a) fixing first and second substrates, both of which are bonded, to a vacuum chuck;
    (b) rotating the vacuum chuck so that the bonded first and second substrates face the ground;
    (c) directing a laser beam to the first and second substrates from below, to cut the substrates.

5. A method for cutting a glass substrate by using a laser cutting device, comprising the steps of:
    (a) fixing first and second substrates, both of which are bonded, to a vacuum chuck;
    (b) directing a laser beam to the second substrate from above, to cut the second substrate;
    (c) rotating the vacuum chuck so that the bonded first and second substrates face the ground; and,
    (d) directing a laser beam to the first substrate from below, to cut the first substrate.

6. A method for cutting a glass substrate by using a laser cutting device, comprising the steps of:
    (a) fixing first and second substrates, both of which are bonded, to a vacuum chuck;
    (b) rotating the vacuum chuck with respect to the ground by an angle, and directing a laser beam to lowered one end portion of each of the first and second substrates, to cut the one end portion of each of the first and second substrates; and
    (c) rotating the vacuum chuck in an opposite direction with respect to the ground, and directing the laser beam to the other end portions of the first and second substrates, to cut the other end portions of the first and second substrates.

7. A method as claimed in claim 6, wherein the bonded first and second substrate are rotated to face the ground with an angle.

8. A method as claimed in claim 6, wherein the bonded first and second substrate are rotated to face the ground with an angle, and the laser beam is directed thereto from below.

9. A method as claimed in claim 8, wherein the laser beam is directed vertical to the substrates.

10. A laser cutting device, comprising:
    a vacuum chuck for securing bonded first and second substrates;
    a rotating member for tilting the vacuum chuck such that the vacuum chuck can be turned upside down; and
    a laser oscillator for directing a laser beam onto the first and second substrates along a cutting direction.

11. A laser cutting device according to claim 10, further comprising a transporter for transporting away substrate pieces cut by the laser beam.

12. A laser cutting device according to claim 11, wherein said transporter receives substrate pieces via gravity.

13. A laser cutting device according to claim 10, further comprising a cleaning device for removing particles from the vicinity of cut surfaces.

14. A method of cutting a glass substrate, comprising the steps of:
    (a) securing bonded first and second substrates to a vacuum chuck;
    (b) rotating the bonded first and second substrates below the vacuum chuck;
    (c) directing a laser beam to the first and second substrates from below so as to cut pieces from the substrates.

15. A method of cutting a glass substrate according to claim 14, further including the steps of catching the cut pieces and then transporting the caught pieces away.

16. A method of cutting a glass substrate according to claim 14, further including the step of blowing glass particles away from a cut.

17. A method of cutting a glass substrate, comprising the steps of:
    (a) securing bonded first and second substrates to a vacuum chuck;
    (b) directing a laser beam onto the second substrate from above so as to cut a piece from the second substrate;
    (c) rotating the vacuum chuck such that the bonded first and second substrates are below the vacuum chuck; and
    (d) directing a laser beam onto the first substrate from below so as to cut a piece from the first substrate.

18. A method of cutting a glass substrate according to claim 17, further including the steps of catching cut pieces and then transporting the caught pieces away.

19. A method of cutting a glass substrate according to claim 17, further including the step of blowing glass particles away from a cut.

20. A method for cutting a glass substrate, comprising the steps of:

(a) securing bonded first and second substrates to a vacuum chuck;
(b) rotating the vacuum chuck at an angle;
(c) directing a laser beam to one end of the bonded first and second substrates so as to cut a piece from the one end of the first substrate and a piece from the one end of the second substrate;
(d) rotating the vacuum chuck in an opposite direction; and
(e) directing a laser beam to a second end of the bonded first and second substrates so as to cut a piece from the second end of the first substrate and a piece from the second end of the second substrate.

21. A method as claimed in claim 20, wherein the laser beam is directed vertical to the substrates.

22. A method of cutting a glass substrate according to claim 17, further including the steps of catching cut pieces and then transporting the caught pieces away.

23. A method of cutting a glass substrate according to claim 17, further including the step of blowing glass particles away from a cut.

* * * * *